(12) United States Patent
Diamond et al.

(10) Patent No.: US 11,319,906 B2
(45) Date of Patent: May 3, 2022

(54) METHODS AND SYSTEMS FOR AN EXHAUST GAS RECIRCULATION SYSTEM

(71) Applicant: Ford Global Technologies, LLC, Dearborn, MI (US)

(72) Inventors: Brendan Diamond, Grosse Pointe, MI (US); David G. Hagner, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/064,247

(22) Filed: Oct. 6, 2020

(65) Prior Publication Data

US 2022/0106932 A1 Apr. 7, 2022

(51) Int. Cl.
*F02M 26/34* (2016.01)
*F02B 37/00* (2006.01)
*F02M 26/22* (2016.01)
*F02M 26/14* (2016.01)
*F02M 26/08* (2016.01)
*F02D 41/00* (2006.01)
(Continued)

(52) U.S. Cl.
CPC ........... *F02M 26/34* (2016.02); *F02B 37/004* (2013.01); *F02B 37/007* (2013.01); *F02B 37/183* (2013.01); *F02B 37/22* (2013.01); *F02D 41/005* (2013.01); *F02D 41/0007* (2013.01); *F02D 41/0077* (2013.01); *F02M 26/08* (2016.02); *F02M 26/14* (2016.02); *F02M 26/22* (2016.02); *F02D 2200/0406* (2013.01)

(58) Field of Classification Search
CPC ........ F02M 26/34; F02M 26/08; F02M 26/14; F02M 26/22; F02B 37/004; F02B 37/007; F02B 37/183; F02B 37/22; F02D 41/0007; F02D 41/005; F02D 41/0077; F02D 2200/0406
USPC .......................... 60/605.2 and, 612; 701/108
See application file for complete search history.

(56) References Cited

U.S. PATENT DOCUMENTS

| 4,756,285 | A | * | 7/1988 | Pischinger | ............. | F02M 26/08 |
| | | | | | | 60/605.2 |
| 5,564,275 | A | * | 10/1996 | Codan | .................... | F02M 26/34 |
| | | | | | | 60/605.2 |

(Continued)

FOREIGN PATENT DOCUMENTS

| CN | 101082302 A | 12/2007 |
| CN | 201218149 Y | 4/2009 |

(Continued)

OTHER PUBLICATIONS

"How to Match a Turbocharger to Your Engine: Step-by-Step Guide," Muscle Car DIY Website, Available Online at https://www.musclecardiy.com/performance/match-turbocharger-engine-step-step-guide/, Feb. 1, 2015, 29 pages.

(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for an EGR system. In one example, a system comprises a first turbocharger configured to increase an intake gas pressure and a second turbocharger configured to increase an exhaust gas pressure. The second turbocharger is dedicated to only compressing exhaust gases flowing to an intake passage.

15 Claims, 3 Drawing Sheets

(51) Int. Cl.
*F02B 37/18* (2006.01)
*F02B 37/22* (2006.01)
*F02B 37/007* (2006.01)

(56) References Cited

U.S. PATENT DOCUMENTS

| | | | | |
|---|---|---|---|---|
| 5,791,146 | A * | 8/1998 | Dungner | F02M 26/34 60/605.2 |
| 5,794,445 | A * | 8/1998 | Dungner | F02M 26/34 60/605.2 |
| 6,164,071 | A * | 12/2000 | Shao | F02M 26/34 60/605.2 |
| 6,216,461 | B1 * | 4/2001 | Shao | F02M 26/34 60/605.2 |
| 6,324,846 | B1 * | 12/2001 | Clarke | F02M 26/34 60/605.2 |
| 7,571,608 | B2 * | 8/2009 | Boyapati | F02M 26/34 60/605.2 |
| 7,721,541 | B2 * | 5/2010 | Roberts, Jr. | F02M 26/34 60/605.2 |
| 8,176,736 | B2 * | 5/2012 | Janssen | F02M 26/34 60/605.2 |
| 8,297,054 | B2 * | 10/2012 | Gladden | F02M 26/34 60/605.2 |
| 8,522,756 | B2 * | 9/2013 | Vuk | F02M 26/34 701/108 |
| 8,793,996 | B2 * | 8/2014 | French | F02M 26/08 60/605.2 |
| 2003/0154716 | A1 * | 8/2003 | Redon | F02M 26/34 60/605.2 |
| 2003/0213244 | A1 | 11/2003 | Faletti | |
| 2007/0193270 | A1 * | 8/2007 | Roozenboom | F02M 26/34 60/605.2 |
| 2008/0000228 | A1 * | 1/2008 | Kieser | F02M 26/34 60/612 |
| 2009/0107123 | A1 * | 4/2009 | Vuk | F02M 26/08 60/605.2 |
| 2011/0094224 | A1 * | 4/2011 | Sheidler | F02B 37/004 60/605.2 |
| 2011/0209473 | A1 * | 9/2011 | Fritz | F02M 26/34 60/605.2 |

FOREIGN PATENT DOCUMENTS

| | | | | |
|---|---|---|---|---|
| CN | 102348879 A | | 2/2012 | |
| CN | 109580229 A | | 4/2019 | |
| JP | 2007154684 A | | 6/2007 | |
| JP | 2009275644 A | * | 11/2009 | ......... F02D 41/0007 |
| JP | 1528339 B2 | | 8/2010 | |

OTHER PUBLICATIONS

"Why do engine manufacturers mostly prefer HP EGR over LP EGR?," Quora Website, Available Online at https://www.quora.com/Why-do-engine-manufacturers-mostly-prefer-HP-EGR-over-LP-EGR, Available as Early as Jan. 2017, 2 pages.

* cited by examiner

METHODS AND SYSTEMS FOR AN EXHAUST GAS RECIRCULATION SYSTEM

FIELD

The present description relates generally to an exhaust gas recirculation system comprising a dedicated turbocharger and cooler.

BACKGROUND/SUMMARY

Exhaust gas recirculation (EGR) systems are increasing in ubiquity as emissions requirements continue to become more stringent. EGR systems divert untreated exhaust gases back to an intake air system to dilute an incoming charge mass and function as a heat sink. Some EGR systems may use a cooler or similar device for cooling the EGR and further decreasing combustion temperatures.

However, EGR systems may have some short-comings. For example, the flow rate of exhaust gases may be limited by a difference in pressure in some locations of the exhaust and intake flows. As such, the EGR flow rate may be limited during certain engine operating conditions, such as when the intake manifold pressure is high, when an exhaust pressure is low, or when an engine speed is low. There may be many operational states where EGR flow is desired but unobtainable.

Other examples of addressing EGR flow rates include providing a boost enhancing device to increase EGR pressures. One example approach is shown in CN 102348879, wherein a booster is used to increase a high-pressure EGR pressure. The high-pressure EGR line further comprises a cooler configured to cool the high-pressure EGR.

However, the inventors have identified some issues with the approaches described above. For example, the booster may be electrically operated, which may increase an electrical load demand on the vehicle. This reduces fuel economy benefits provided by the EGR while also limiting a number of vehicle architectures in which the booster may be arranged. For example, the booster may only be arranged in vehicles with electrical arrangements suitable for driving the booster while also driving other electrical components of the vehicle.

In one example, the issues described above may be addressed by a system comprising a first turbocharger configured to compress intake gases and a second turbocharger configured to compress high-pressure exhaust gases flowing to an intake passage. In this way, the second turbocharger is dedicated to providing pressurized EGR when desired.

As one example, the second turbocharger uses exhaust gas as the working fluid, wherein exhaust gas rotates a turbine of the second turbocharger. The second turbocharger further uses exhaust gas as the compressed fluid, wherein a compressor of the second turbocharger compresses exhaust gas to create a desired differential pressure between the EGR and the intake manifold. As such, EGR may flow to the intake manifold during conditions where it would otherwise be not possible. A cooler may be optionally arranged downstream of the compressor so that cooled EGR may be provided to the intake manifold.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a turbocharger dedicated to pressurizing exhaust gases for exhaust gas recirculation. In one example, a vehicle comprises a first turbocharger configured to compress intake air via a first compressor and a first turbine. The vehicle further comprises a second turbocharger configured to compress exhaust gas via a second compressor and a second turbine. An example of the vehicle is illustrated in FIG. 1.

Figure 2:
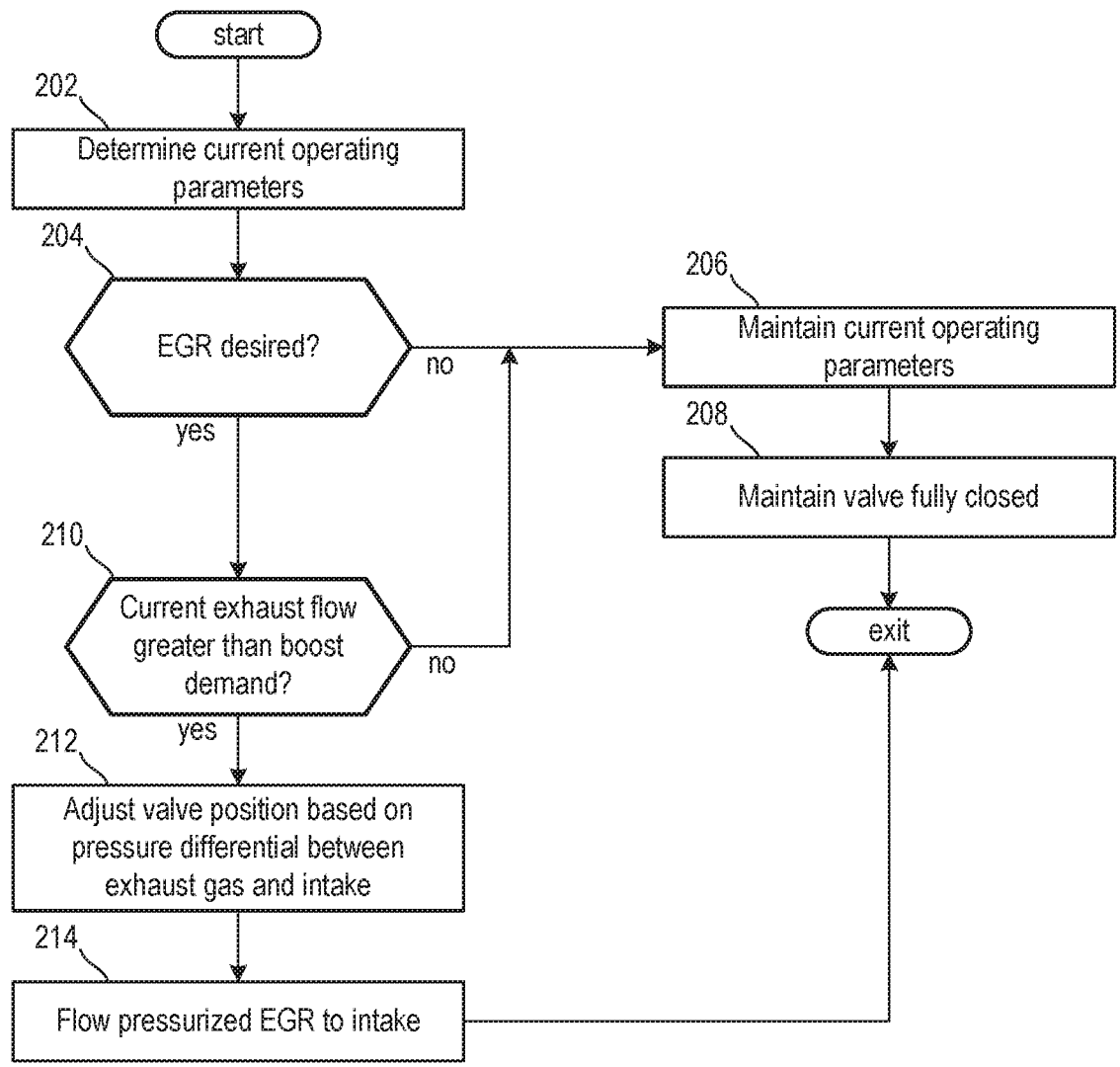
FIG. 2 illustrates a method for operating a turbocharger for pressurizing exhaust gas.
Figure 3:
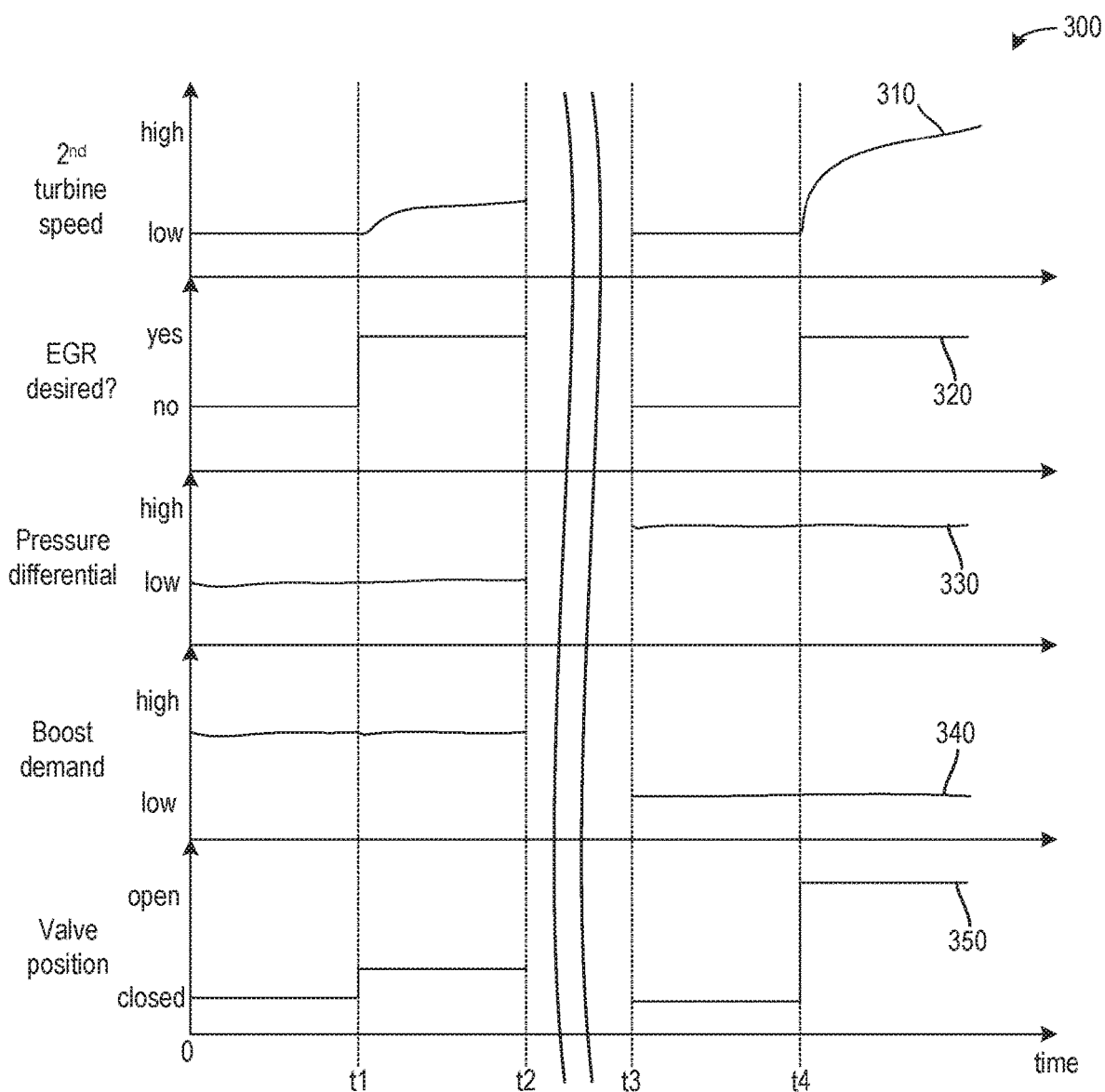
FIG. 3 illustrates a prophetic engine operating sequence relating engine operating parameters and adjusting turbocharger operations.

A method for operating the second turbocharger to provide EGR when EGR is desired is described in FIG. 2. A graph illustrating a prophetic engine operating sequence of the second turbocharger being activated in response to a pressure differential of the intake manifold being greater than an exhaust gas pressure is shown in FIG. 3.

Figure 1:
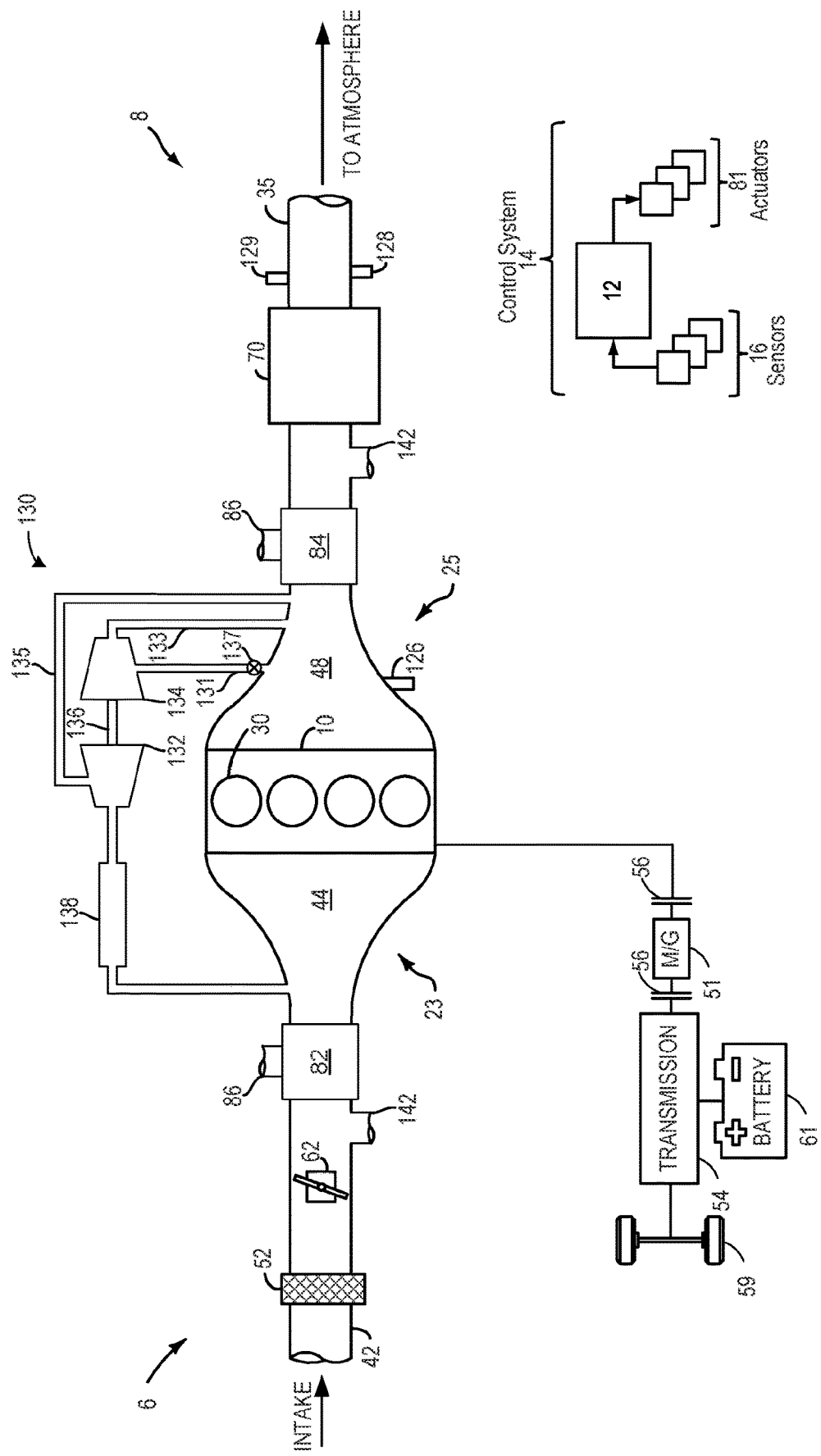
FIG. 1 illustrates a schematic of an engine included in a hybrid vehicle.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include at least one emission control device 70 mounted in a close-coupled position or in a far underbody position. The emission control device 70 may include a three-way catalyst, lean NOx trap, particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

In the example of the present disclosure, the emission control device 70 is a particulate filter 70. In one example, the particulate filter 70 is a gasoline particulate filter. In another example, the particulate filter 70 is a diesel particulate filter.

The engine system 8 further comprises a first turbocharger having a first compressor 82 and a first turbine 84. The first compressor 82 and the first turbine 84 are mechanically coupled via a first shaft 86. The first turbine 84 may be driven via exhaust gases flowing through the exhaust passage 35. The exhaust gases may rotate a rotor of the first turbine 84, which may rotate the first shaft 86, resulting in rotation of a rotor of the first compressor 82. The first compressor 84 is configured to receive and compress intake air.

The engine system 8 further comprises a pressurized EGR system 130. The pressurized EGR system 130 comprises a second turbocharger comprising a second compressor 132 and a second turbine 134. The second compressor 132 and the second turbine 134 are mechanically coupled via a second shaft 136. The second turbine 134 may be driven via exhaust gases flowing through the exhaust passage 35. The exhaust gases may rotate a rotor of the second turbine 134, which may rotate the second shaft 136, resulting in rotation of a rotor of the second compressor 132. The second compressor 132 is configured to receive and compress exhaust gases.

The pressurized EGR system 130 further comprises a first passage 131, a second passage 133, and a high-pressure (HP) EGR passage 135. In the example of FIG. 1, the first passage 131 interfaces with the exhaust passage 35 at a junction upstream of the second passage 133, wherein the second passage 133 interfaces with the exhaust passage 35 at a junction upstream of the HP-EGR passage 135. The first passage 131 is configured to receive exhaust gases from the exhaust passage 35, wherein the exhaust gases drive the second turbine 134. The second turbine 134 may then expel the exhaust gases through the second passage 133 back into the exhaust passage 35. The HP-EGR passage 135 receives and flows exhaust gases to the second compressor 132. The second compressor 132 may compress and pressurize (e.g., increase a pressure of) the exhaust gases, before the exhaust gases continue through the HP-EGR passage 135 to a heat exchanger 138. Following flowing through the heat exchanger 138, the HP-EGR flows to the engine intake 23. The HP-EGR passage 135 may fluidly couple to the engine intake upstream or downstream of the throttle 62. In the example of FIG. 1, the HP-EGR passage 135 fluidly couples to the intake downstream of the throttle.

In one example, the heat exchanger 138 may be a liquid-to-liquid or an air-to-liquid cooler. The heat exchanger 138 may be configured to receive coolant from a cooling system of the hybrid vehicle 6, such as an engine cooling system or other similar cooling system. Additionally or alternatively, the heat exchanger 138 may comprise a cooling system separate from other cooling system of the hybrid vehicle 6. In some examples, a bypass passage may be included in the pressurized EGR system 130, wherein the bypass passage is configured to flow pressurized exhaust gases around the heat exchanger 138 during conditions where cooling may not be desired. In one example, cooling may not be desired during conditions where an engine temperature is less than a desired temperature, such as during a cold-start.

In the example of FIG. 1, the hybrid vehicle 6 further comprises a low-pressure (LP) EGR passage 142. The LP-EGR passage 142 is configured to divert exhaust gases from downstream of the first turbine 84 to a portion of the intake passage 42 upstream of the first compressor 82. Additionally or alternatively, in some examples, the hybrid vehicle 6 may be configured without the LP-EGR passage 142 without departing from the scope of the present disclosure.

The EGR system 130 further comprises a valve 137 configured to adjust EGR flow through the first passage 131. In some examples, the valve 137 may be adjusted in response to one or more of an EGR demand and/or a boost demand. For example, the valve 137 may be moved to a more open position in response to the EGR demand increasing. As another example, the valve 137 may be moved to a more closed position in response to the boost demand increasing, thereby allowing more exhaust gas to flow to the first turbine 84. In one example, the valve 137 may be moved to a fully closed position, a fully open position, and positions therebetween. The fully closed position may be configured to block exhaust gas from entering the first passage 131. The fully open position may be configured to allow a maximum flow of exhaust gas to enter the first passage 131. The more open position may be configured to allow more exhaust gas to enter the first passage 131 than the more closed position.

In one example, the valve 137 may be configured as a wastegate valve wherein a wastegate passage may be configured to bypass exhaust gases away from the second turbine 134. In such an example, the wastegate valve may be opened to decrease EGR flow to the intake and closed to increase EGR flow to the intake. In some examples, additionally or alternatively, the first turbine 84 may comprise a wastegate valve.

In some examples, additionally or alternatively, a valve may be arranged in the HP-EGR passage 135. The HP-EGR passage 135 may comprise a valve between the second compressor 132 and the exhaust passage 35. In one example, the valve may be operated in conjunction with the valve 137 such that both are opened and closed together. By arranging the valve in the HP-EGR passage 135, exhaust gas may be blocked from filling the HP-EGR passage 135 when EGR is not desired.

Hybrid vehicle 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and the electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

In this way, a vehicle comprises a first turbocharger configured to provide boost air and a second turbocharger configured to provide pressurized exhaust gas. The second turbocharger receives high-pressure exhaust gas from a junction in an exhaust passage upstream of the first turbocharger, wherein the second turbocharger is configured to further increase a pressure of the exhaust gas. The second turbocharger is configured to use exhaust gas as both a working fluid and a compressed fluid. In one example, conditions where a manifold absolute pressure (MAP) is high, previous examples of EGR systems may be unable to flow sufficient amounts of EGR. The second turbocharger may be configured to increase the pressure of the EGR such that a desired amount of exhaust gas may flow to the intake system when MAP is high during a high engine load and a high engine speed. For example, EGR flow during increasing MAP at relatively constant torque may reduce EGR flow in examples without a dedicated EGR turbocharger. As such, the dedicated EGR turbocharger may provide EGR during such a condition In such an arrangement, exhaust gases of the engine may spin the turbine wheel, which may then spool up the compressor wheel and pressurize exhaust gases that may be forced into the intake system. The amount of pressurization may be dependent on a desired EGR flow rate and controlled by utilizing a valve or other control device. After being pressurized, the exhaust gases may pass through a heat exchanger, such as an EGR cooler, then through an optional valve arranged at an interface between the EGR passage and the intake passage. In some examples, additionally or alternatively, the second turbocharger may be sized based on an air/fuel ratio, a compressor size/configuration, and/or a turbine size/configuration to provide a desired EGR flow during a plurality of engine operating conditions.

The dedicated EGR turbocharger is configured to increase EGR pressures to those greater than high-pressure EGR in previous examples, which may allow the EGR valve to be opened to less open positions while providing a similar amount of EGR to the intake relative to more open positions in previous examples. The dedicated EGR turbocharger may be further configured to block blowthrough where intake gases flow through the EGR passage during certain positions of the crank.

Turning to FIG. 2, it shows a method 200 of operating the second turbocharger in response to one or more engine conditions. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 200 begins at 202, which includes determining, estimating, and/or measuring current operating parameters. Current operating parameters may include but are not limited to one or more of a throttle position, a manifold vacuum, an engine speed, an engine temperature, a boost pressure, and an air/fuel ratio.

The method 200 may proceed to 204, which may include determining if EGR is desired. EGR may be desired in response to one or more of an engine combustion temperature being higher than a desired combustion temperature and an emissions value being greater than a desired emissions value.

If EGR is not desired, then the method 200 may proceed to 206, which includes maintaining current operating parameters.

The method 200 may proceed to 208, which includes maintain a valve fully closed.

Returning to 204, if EGR is desired, then the method 200 may proceed to 210, which includes determining if a current exhaust flow is greater than a boost demand. That is to say, it is determined if a current exhaust gas production is greater than an amount needed to meet the boost demand. If the current exhaust flow is not greater than the boost demand, then the method 200 proceeds to 206 and does not utilize the second turbocharger to provide pressurized. In this way, driver demand may be prioritized over EGR demands. In some examples, additionally or alternatively, EGR demands may be prioritized over driver demand during some engine operating modes. For example, if the vehicle operator selects a fuel economy prioritization mode (e.g., an ECO mode), then the method 200 may prioritize reducing emissions over driver demand.

If the current exhaust flow is greater than an amount needed to meet the boost demand, then the method 200 proceeds to 212, which includes adjusting a valve position. In one example, the valve position is adjusted based a pressure differential between the exhaust gas and the intake. For example, the valve position may be adjusted to a more open position as the pressure differential increases. Additionally or alternatively, the valve position may be adjusted to a more closed position as the pressure differential decreases. In one example, if the exhaust pressure is greater than the intake pressure such that the pressure differential is a negative value, then the valve position may be adjusted to a less open position relative to an example where the EGR is not pressurized (e.g., where a turbocharger is not used to pressurize exhaust gas).

The method 200 proceeds to 214, which includes flowing pressurized EGR to the intake. Flowing pressurized EGR comprises flowing high-pressure exhaust gases to the second turbine, which in turn rotates the second compressor. The second compressor then compresses high-pressure exhaust gases and flows the pressurized exhaust gases to the intake. The pressurized exhaust gases may optionally flow through a heat exchanger and thermally communicate therewith prior to reaching to the intake.

Turning now to FIG. 3, it shows a graph 300 illustrating an engine operating sequence comprising adjustments to a valve position to adjust exhaust gas flow to a second turbocharger. Plot 310 illustrates a second turbine speed. Plot 320 illustrates if EGR is desired. Plot 330 illustrates a pressure differential between the exhaust and the intake. Plot 340 illustrates a boost demand. Plot 350 illustrates a valve position. Time increases from a left to a right side of the figure.

Prior to t1, the second turbine speed is low (plot 310). In one example, a low second turbine speed may be zero, thereby indicating the second turbine is stationary. As such, the valve position is fully closed (plot 350). The valve is in the fully closed position due to EGR is not being desired (plot 320). In the example of FIG. 3, the pressure differential is relatively low (plot 330) and the boost demand is closer to a relatively high demand than a relatively low demand (plot 340). At t1, EGR is desired. As such, the valve is moved to an open position. In one example, the open position is a less open position, wherein the less open position is more similar to the fully closed position than the fully open position. That is to say, the valve may be less than 50% open. In one example, the less open position is selected in response to one or more of the pressure differential being low and the boost demand being relatively high. In some examples, additionally or alternatively, the valve position may be based on a magnitude of an EGR demand, wherein the valve may be moved to a more open position as the magnitude increases and to a more closed position as the magnitude decreases.

Between t1 and t2, the second turbine speed increases as exhaust gases flow thereto. In this way, a pressurized exhaust gas flows to the intake, wherein the pressurized exhaust gas comprises a pressure greater than high-pressure EGR drawn from upstream of the first turbine without flowing through a compression device.

Between t2 and t3, an extended amount of time passes. Between t3 and t4, the valve position is a fully closed position. The boost demand is relatively low, wherein the boost demand between t3 and t4 is less than the boost demand prior to t2. The pressure differential is relatively high. In one example, the pressure differential may be relatively high during a high engine load where manifold air pressure increase.

At t4, the valve is moved to the fully open position in response to EGR being desired and the pressure differential still being relatively high. After t4, the second turbine speed increases to a relatively high turbine speed due to the valve position being fully open and a maximum amount of exhaust gas flowing thereto. As such, the second compressor may compress the exhaust gases to a pressure greater than an intake pressure, thereby overcoming the pressure differential and providing pressurized EGR to the intake.

In this way, an engine system comprises a first turbocharger and a second turbocharger, wherein each of the turbochargers is configured to pressurize a gas via exhaust gases rotating a turbine rotor. The first turbocharger is configured to compress intake gases via a first compressor as exhaust gases flow through a first turbine. The second turbocharger is configured to compress exhaust gases via a second compressor as exhaust gases flow through a second turbine. The technical effect of dedicating the second turbocharger to pressurizing high-pressure EGR is to increase a number of conditions in which EGR flows to the intake. That is to say, the second turbocharger may pressurize the high-pressure EGR during conditions where an intake pressure is greater than an exhaust pressure such that pressurized high-pressure EGR may overcome the pressure differential and mix with intake gases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a first turbocharger configured to compress intake gases, the first turbocharger comprising a first compressor and a first turbine;
   a second turbocharger configured to compress high-pressure exhaust gases flowing to an intake passage, the second turbocharger comprising a second turbine and a second compressor;
   a first passage configured to flow exhaust gases from an exhaust passage to the second turbine;
   a valve configured to adjust an exhaust gas flow through the first passage; and
   a controller with computer-readable instructions stored on non-transitory memory thereof that when executed enable the controller to adjust a position of the valve in response to one or more of a pressure differential between an intake system and an exhaust system and a boost demand when exhaust-gas recirculation is desired.

2. The system of claim 1, wherein the first turbocharger comprises the first compressor mechanically coupled to the first turbine via a first shaft.

3. The system of claim 2, wherein the first compressor is configured to receive and compress intake gases.

4. The system of claim 2, wherein the second turbocharger comprises the second compressor mechanically coupled to the second turbine via a second shaft.

5. The system of claim 4, wherein the second compressor is configured to receive and compress exhaust gases.

6. The system of claim 1, wherein the second turbocharger is arranged upstream of the first turbocharger relative to a direction of exhaust gas flow.

7. The system of claim 1, wherein a heat exchanger is arranged between the intake passage and the second turbocharger.

8. An engine system, comprising:
   a first turbocharger comprising a first compressor mechanically coupled to a first turbine via a first shaft, wherein the first compressor is configured to compress intake gases;
   a second turbocharger comprising a second compressor mechanically coupled to a second turbine via a second shaft, wherein the second compressor is configured to compress exhaust gases;
   a first passage configured to flow exhaust gases from an exhaust passage to the second turbine and a second passage configured to flow exhaust gases from the second turbine to the exhaust passage, and wherein the first passage and the second passage are fluidly coupled to the exhaust passage at a junction upstream of the first turbine relative to a direction of exhaust gas flow, wherein a valve is configured to adjust an exhaust gas flow through the first passage; and
   a controller with computer-readable instructions stored on non-transitory memory thereof that when executed enable the controller to adjust a position of the valve in response to one or more of a pressure differential between an intake system and an exhaust system and a boost demand when exhaust-gas recirculation is desired.

9. The engine system of claim 8, wherein a high-pressure exhaust gas recirculation passage is configured to direct high-pressure exhaust gases from upstream of the first turbine to the second compressor, and wherein the high-pressure exhaust gas recirculation passage comprises a heat exchanger between the second compressor and an intake passage.

10. The engine system of claim 8, wherein the second compressor receives only exhaust gases.

11. The engine system of claim 8, wherein the second compressor is dedicated to only compressing exhaust gas.

12. The engine system of claim 8, wherein exhaust gases drive a turbine rotor of the second turbine, the turbine rotor is configured to drive the second compressor via the second shaft.

13. An EGR system, comprising:
   an EGR turbocharger comprising a turbine and a compressor, wherein the turbine is rotated via exhaust gases flowing through a valve in an at least partially open position, and wherein the compressor is mechanically coupled to the turbine via a shaft when the turbine rotates;
   an EGR passage fluidly coupled to the compressor, wherein the compressor is configured to compress exhaust gas, wherein the EGR passage further comprises a heat exchanger arranged between an intake passage and the compressor; and
   a controller with computer-readable instructions stored on non-transitory memory thereof that when executed enable the controller to adjust a position of the valve in response to an EGR request, wherein the instructions further enable the controller to adjust the position of the valve to a more open position in response to a pressure differential between the intake passage and an exhaust passage increasing, and wherein the position of the valve is adjusted to a less open position in response to the pressure differential between the intake passage and the exhaust passage decreasing, wherein the more open position flows more exhaust gas to the turbine than the less open position.

14. The EGR system of claim 13, wherein the EGR turbocharger is fluidly coupled to an exhaust passage at a junction upstream of a turbocharger configured to compress intake gases relative to a direction of exhaust gas flow.

15. The EGR system of claim 13, wherein the EGR turbocharger compresses high-pressure exhaust gas.

* * * * *